US011748556B1

(12) United States Patent
ElGamal

(10) Patent No.: US 11,748,556 B1
(45) Date of Patent: Sep. 5, 2023

(54) SYSTEM AND METHOD OF ENHANCING PDF DOCUMENTS

(71) Applicant: Ahmed Mohamed Hany AbdelAlim ElGamal, Maadi (EG)

(72) Inventor: Ahmed Mohamed Hany AbdelAlim ElGamal, Maadi (EG)

( * ) Notice: Subject to any disclaimer, the term of this patent is extended or adjusted under 35 U.S.C. 154(b) by 0 days.

(21) Appl. No.: 17/818,473

(22) Filed: Aug. 9, 2022

(51) Int. Cl.
*G06F 17/00* (2019.01)
*G06F 40/169* (2020.01)
*G06F 16/93* (2019.01)
*G06F 3/0482* (2013.01)

(52) U.S. Cl.
CPC .......... *G06F 40/169* (2020.01); *G06F 3/0482* (2013.01); *G06F 16/93* (2019.01); *G06F 2203/04803* (2013.01)

(58) Field of Classification Search
CPC .... G06F 40/169; G06F 40/279; G06F 3/0482; G06F 16/93; G06F 2203/04803
USPC ........................................................ 715/234
See application file for complete search history.

(56) References Cited

U.S. PATENT DOCUMENTS

| | | | | |
|---|---|---|---|---|
| 7,698,311 B2* | 4/2010 | Stevenson | ........... | G06F 16/9577 707/602 |
| 8,745,067 B2* | 6/2014 | Cierniak | ................. | G06F 16/22 715/232 |
| 9,047,784 B2* | 6/2015 | Brownlow | ............... | G09B 5/06 |
| 10,027,617 B2* | 7/2018 | Faramarzi | ............... | H04L 51/52 |
| 10,042,951 B2* | 8/2018 | Caliman | ............. | G06F 16/9577 |
| 10,157,070 B2* | 12/2018 | Barash | ..................... | G06F 9/453 |
| 10,867,126 B2* | 12/2020 | Lockhart | ............. | G06F 16/9577 |
| 11,068,664 B2* | 7/2021 | Carrier | .................. | G06F 40/169 |
| 2013/0297997 A1* | 11/2013 | Stanley | ................. | G06F 40/174 715/202 |
| 2018/0039606 A1* | 2/2018 | Lysenko | ............... | G06F 40/143 |
| 2018/0253412 A1* | 9/2018 | Biswas | ............... | H04L 65/4015 |

OTHER PUBLICATIONS

Ashish Tiwari, What is PDF Metadata: Everything You Need to Know, Allyant.com, published May 13, 2020 (Year: 2020).*

* cited by examiner

*Primary Examiner* — Stephen S Hong
*Assistant Examiner* — Matthew J Ludwig
(74) *Attorney, Agent, or Firm* — Stephen E. Zweig

(57) ABSTRACT

System and method of enhancing previously published PDF document files, including files signed or locked to prevent further editing, with enhancement data stored external to the PDF document files. Here an internet server (enhancement server) is configured with a database that stores a plurality of PDF document files, linked with corresponding PDF document URL, enhanced content data, and statistics. When the enhancement server receives a particular PDF document URL request, it returns annotated PDF information that combines the original PDF document and the enhanced content data. This annotated PDF information can be viewed in the GUI of a remote computerized device. The enhancement server can also receive user input from the remote device, store user uploaded data and files, update user statistics, and use this data to enhance the PDF files further. Applications include PDF linked Q&A, lectures, walk-throughs, enhanced media, and chat sessions.

23 Claims, 8 Drawing Sheets

SYSTEM AND METHOD OF ENHANCING PDF DOCUMENTS

BACKGROUND OF THE INVENTION

Field of the Invention

This invention is in the fields of PDF document management and internet communications.

Description of the Related Art

The Portable Document Format (PDF) is an internationally standardized method of representing documents in the form of system-independent files. The current ISO standard was first released in 2008 as ISO 32000-1:2008, and is presently up to 32000-2:2020.

The PDF specification was originally released in 1992, and since then, it has become a widely used digital format for desktop publishing and transmitting and storing complex documents. The standard encompasses digital signatures, rights management, and security functions. PDF documents may be signed or locked to prevent further editing after publication.

Many individuals and organizations widely use PDF documents, including education, government, and commercial enterprises. Instructors may maintain websites with links to PDF documents containing class reading assignments. Governments may maintain websites with links to PDF documents containing regulations or government information; businesses may maintain websites with PDF documents containing instruction manuals, specifications, and sales brochures for their various products. These PDF files are generally free from security and digital rights management restrictions.

BRIEF SUMMARY OF THE INVENTION

The invention was partly inspired by the insight that prior art systems of handling PDF files by web servers and web browsers often produced suboptimal results.

As previously discussed, organizations (companies, schools, governments, and the like) often post links to PDF files on their websites. These PDF files, which often may be signed or locked to prevent further editing, are used for many purposes, such as demonstrating a product, providing a user manual, user guide, or other informative documents. Organizations that post such PDF file links encounter several problems, however. When a website user clicks on any of those PDF links, the web server/web browser system will automatically transfer the user out of the PDF posting website/web browser to the user's PDF viewing software, which can often be a third-party program such Adobe Acrobat Reader:

As a result, the posting organization often loses track of subsequent user engagement and interaction with the PDF document. The posting organization no longer knows the amount of time spent per user on a given PDF document, where the user clicks on the document (mouse heat map), the amount of time spent on a given PDF page per user, number of times the given PDF document was stored on the user's drive, number of times users printed the document, what materials/text users copied from the document, and the like.

When a PDF document user/viewer/reader has a question regarding a particular PDF section, they must go through a laborious set of steps. They often have first to take a screenshot of that PDF document part, open the posting organization's website contact list, find the proper contact, open an email, ask their question, attach the screenshot, and wait for the answer. This is slow and inconvenient, and the user often loses track of where they asked the question. In most cases, the user gets the answer through an email message.

PDF documents, and certainly signed or locked PDF documents, are inherently static files. Organizations that provide PDFs on their websites cannot easily include additional PDF context videos, audio, or 3D files for users to play directly. Instead, the users must click other links and go to an external website.

Organizations that sell PDFs on their website (for example, lawyers selling templates of contracts or authors selling books) often have to do so using a different platform/website. There is no way to further sell through the PDF document itself.

Although search engines such as Google index PDFs, they may use different criteria, and the PDF documents are usually not optimized for Search Engine Optimization (SEO). The PDF documents often lack important metadata, content engagement metrics, and backlinks. Thus, an organization that relies on linked PDFs may hide this information from search engines and outside searchers. When an SEO user does find something on a search engine, the search engine may take the SEO user directly to the linked PDF, entirely skipping the organization's website Another problem with prior art methods is that if an SEO user clicks on the SEO engine link, they will be taken to the PDF offline, and the user will not see the main website (sba.gov) that created this PDF. The company and the user lose the chance to interact with one another.

From the educational perspective, instructors using PDFs (textbooks for example) with their students cannot insert questions on their PDFs and get replies from multiple students on these questions.

Prior art methods do not allow users to interact with one another on the PDF. When an organization inserts a PDF link on their website, prior art methods only allow each subsequent document user to use that PDF document in isolation. Within the pdf context, users can't ask questions, annotate, post material, reply to one another, or chat privately with other users who may have copies of that same PDF document open simultaneously.

The systems and methods described herein are designed to avoid these problems. In one embodiment, the invention may be a system and method of enhancing PDF documents. According to the invention, organizations (or other invention users) may upload their PDF document files (PDF files) into a novel type internet server, here called an "enhancement server", that will typically comprise at least one server computer processor, network connection, and database. This enhancement server enables the system to enrich the PDF files with additional content and other functionalities. The enhancement server can also provide a URL link to the various PDF files stored in the database. This enables the organization to provide links to the various relevant files from the organization's website.

In some embodiments, when a user clicks on a link to a given PDF file stored in the enhancement server, the server may open a PDF in the user's remote computerized device using an online viewer that can be any of a web browser and HTML (such as HTML 5) or an app.

This approach allows all user engagement with the PDF to be tracked, as desired. This enables the organization to accumulate various types of statistics, such as the amount of time spent per user on a document, where the user clicks (mouse heat map), the amount of time spent on per page over the various users, number of times this document was stored on a user's drive, number of times various users printed the PDF document, what materials/text were copied from the document, and the like.

Another advantage of the invention's approach is that it makes it easier to create interactive PDF documents. For example, if the user has a question, they don't need to take screenshots and move through different platforms. Instead, the user can insert their inquiries into the relevant portion of the PDF and press send. The invention's enhancement server can then direct the question to the relevant party (for example, customer support, an instructor, or the like) and return the answer to the user. The system can also enable subsequent discussions, keep track of previous Q&A sessions, and the like, all within the context of the PDF document.

The system can also be configured to allow organizations/instructors/users to annotate PDF files with additional information, such as verbal or graphical "walkthrough" type annotation. Here, for example, assume that the organization is an educational institution. An instructor with proper authorizations can use the system to record a walkthrough on top of the PDF for their class students to play. This can be, for example, an audio or video segment associated with various pages or paragraphs to help guide the student (user) from one part of the PDF document to another part. Other PDF enhancement data, regardless of whether it is used in a walkthrough context, include multimedia files such as video, audio, 3D files & images, and the like. According to the invention, these files can be seen directly in the PDF, rather than only through a link.

For example, assume that the system is being used to store various multimedia data in the context of a particular PDF file, such as "the GMAT Official Guidebook." Assume that a well-regarded tutor or tutoring organization wishes to enhance this book with a "walkthrough" providing additional information for the guidebook readers.

Here the enhancement server has a database that stores the GMAT Guidebook PDF file and the various multimedia recordings used to annotate this PDF file. The system database is configured to store various coordinates in the PDF file associated with the various multimedia files. This can be the the X, Y page coordinates related to a specific multimedia file in that particular PDF file (GMAT book).

Now when a user on the other side of the world uploads their GMAT Guidebook" from the enhancement server, the enhancement server can notify the user that a walkthrough for that book exists. The user could then choose to obtain/download that particular walkthrough and read that GMAT Guidebook PDF while simultaneously seeing it annotated with this multimedia information.

Similar techniques can also be used to reveal/unlock portions of a given PDF file. For example, an organization, author, or publisher can configure the enhancement server to selectively show parts of a given PDF file to some users (higher grade levels, premium plan users, higher security levels, and the like) according to various authorization schemes.

In some embodiments, other PDF file enhancements can comprise questions/surveys, user chat, or discussion groups, where users can exchange text, audio or video messages and discussions relating to certain aspects of a given PDF file. In some embodiments, the enhancement server annotation data can also comprise bots, such as software or data for automated chatbots, that can enhance a given PDF file by auto-responding to various user questions or comments.

As desired, these enhancements can be shown overlaid on a given PDF file page, on various side panels to the left, right, top, or bottom of any given PDF file page, or in the "white space" pages (e.g., extra system generated pages) between PDF file pages.

Search Engine Optimization:

As previously discussed, prior art PDF files were not always optimally handled by search engines. In some embodiments, the system's enhancement server can be further configured to enhance a PDF file's SEO score. Here, for example, the enhancement server can scan the PDF file and use a document AI keyword extraction algorithm to annotate the PDF file with relevant keyword metadata. The PDF files title and description can also be suitably enhanced for greater SEO effectiveness. In some embodiments, the enhancement server can look up the present SEO score of a webpage on a given search engine, store this as a reference value, and iteratively improve its real-world SEO score as a function of real-world SEO feedback.

BRIEF DESCRIPTION OF THE DRAWINGS

FIG. 3 shows an example of the system displaying an original PDF in the central panel enhanced with various enhanced content data in the first and second side panels. Here the first side panel includes a user interface with various regions configured to detect viewer GUI "mouse" input in these regions. The system will be configured to receive viewer GUI input in these regions and provide additional enhanced content data, and/or redirect the viewer input to other servers.

FIG. 5 shows how the system can alternatively be configured to use the first side panel to show comments from other users/viewers.

FIG. 6 shows how in some embodiments, the system can be configured to temporarily use the main panel to display a list of other system users and the PDF documents they are reading. This can be useful for group discussion and other group efforts.

DETAILED DESCRIPTION OF THE INVENTION

Figure 1:
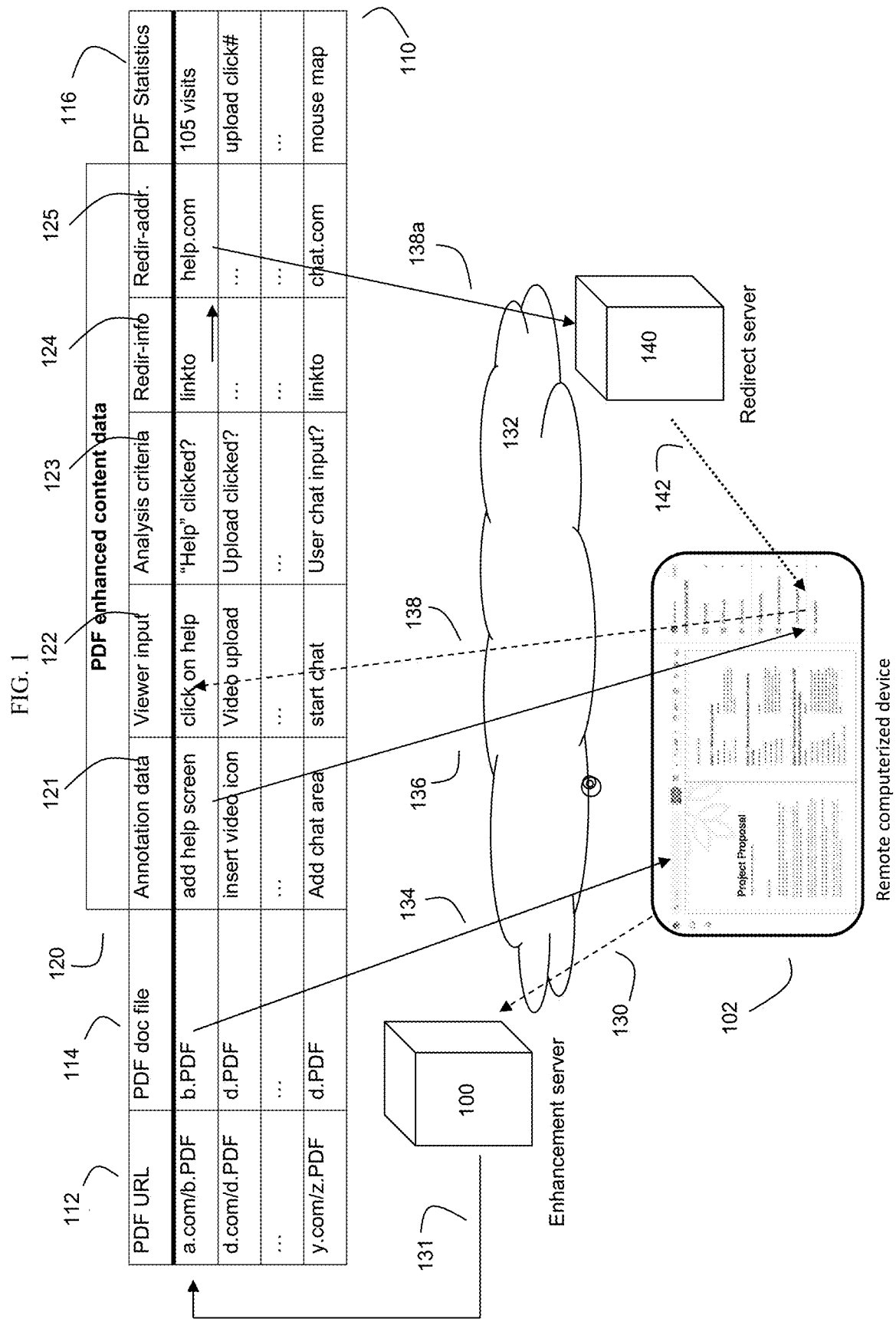
FIG. 1 shows an overview of the PDF enhancement system. Here an internet server (enhancement server) is configured with a database that stores various PDF files, as well as other types of data that can be used to annotate and/or enhance the utility of the PDF files. When a remote computerized device requests a particular PDF file, the enhancement server delivers portions of the PDF file combined with various enhanced content data. This can make the original PDF file more valuable to both the PDF file owners and viewers.

FIG. 1 shows an overview of the PDF enhancement system and method. Here a type of internet server (here called an enhancement server 100) is configured with a database (110) that stores various PDF files (114 and at least their URL addresses 112), as well as other types of data (120-125, 116) that can be used to annotate and/or enhance the utility of the PDF files. When a remote computerized device (102) requests (130) a particular PDF file, the enhancement server delivers (transmits over the internet 132), portions (134) of the PDF file combined with various enhanced content data (136). This can make the original PDF file more useful to both the PDF file owners and viewers.

Alternatively, in some embodiments, the invention may be a system and method of enhancing PDF documents. These are usually previously published pdf documents, such as pdf documents that have previously been completed before the enhancement process. Indeed, these may be pdf documents that have previously been locked to prevent further editing. Here the signed or locked status of the PDF documents does not matter because, according to the method, the PDF document will be enhanced with data stored external to the PDF documents.

Here using methods format, the invention may be a method comprising using an enhancement server (100) comprising at least one server processor and a database (110) to store a plurality of PDF document files (114). Here, for at least some of these various PDF document files, the database links the PDF document files with various database fields, such as at least one corresponding PDF document URL (112), different corresponding PDF document enhanced content data (120, 121), and related PDF document statistics (116).

In operation, the enhancement receiver receives a PDF document URL request (130) comprising a request PDF document URL from a remote computerized device (102). The enhancement server then uses this request PDF document URL and the corresponding PDF document URL (112) stored in the database to look up (131) a related PDF document file (114). Depending on the nature of the request or recent use patterns, the enhancement server obtains at least some PDF information from its PDF document file. At the same time, the server also gets PDF annotation data (121) from the corresponding PDF document enhanced content data (120).

The enhancement server then combines this PDF information (114) with the PDF annotation data (121) thus producing at least some annotated PDF information (134, 136). (The combination can be done at the server itself or can be done at the remote computerized device 102.) The enhancement server then transmits this annotated PDF information (114, 121) over the internet (132) to the remote computerized device (102).

The remote computerized device, in turn, displays (102) the annotated PDF information on a computer screen, such as a graphical user interface (GUI), while also receiving viewer GUI input pertaining to the annotated PDF information (138). Here for example, a human user will typically be viewing the annotated PDF information and will be responding to it by any of voice input, text input, touch input, or mouse input (all here just called "input"), which the remote computerized device processor will detect, and in turn transmit over the internet to the enhancement server.

The enhancement server then receives at least some viewer GUI input (138) pertaining to annotated PDF information from the remote computerized device. The server then is configured to use at least one set of analysis criteria (123), to process at least some viewer GUI input (138) according to the annotated PDF information (113, 121), and perform any of various functions. These functions can include updating the corresponding PDF document statistics (116) and updating the corresponding PDF document enhanced content data (120, 121).

The various database memory fields in the database are typically configured to store and retrieve any type of digital data, often as binary large objects, including text, graphics, video, multimedia, computer code, and the like. In some embodiments, the corresponding PDF document enhanced content data (120) comprises at least one set of redirect information (124) and redirect addresses (125). Here, for example, the at least one server processor (100) may be configured to use the viewer GUI input (138) and this redirect information (125) to transmit at least some of the viewer GUI input (138), as redirected viewer GUI input to a redirect address (125), at least when any of the server processor or the remote computerized device processor determines that at least some of the viewer GUI input (138) matches this redirect information (124).

This redirect address could send the viewer GUI input to another memory location or section on the enhancement server (100) for subsequent processing. Alternatively, the redirect address could send the viewer GUI input to one or more entirely different internet server(s) (140), here called a "redirect server."

Consider the case where the viewer GUI input (138, 138a) is a question regarding some portion of the displayed PDF file. The enhancement server could handle this question directly, or a different redirect server could handle it.

Thus, in some embodiments, either the enhancement server (100) and database (110), or a redirect server (140) and redirect database, and the redirect address (125) can receive and analyze this redirected viewer GUI input (138, 138a). As a result of this analysis, either the enhancement server or the redirect server can provide additional redirected response PDF document enhanced content data (142) back. This could be an answer to the question, or it could be any other type of response. In either event, this response can be routed back to any of the corresponding PDF document enhanced content data (134, 136) (this can store the answer for future use), corresponding PDF document statistics (116) (this can update the statistics to say, for example, 1005+1 answers), and the remote computerized device (102) (where, for example, the answer can be displayed).

The redirect server (140) can handle any type of data and media. In addition to handling user questions, chat sessions, additional media, and the like, the redirect server can also handle financial issues, such as payment processing, as needed.

Figure 2:
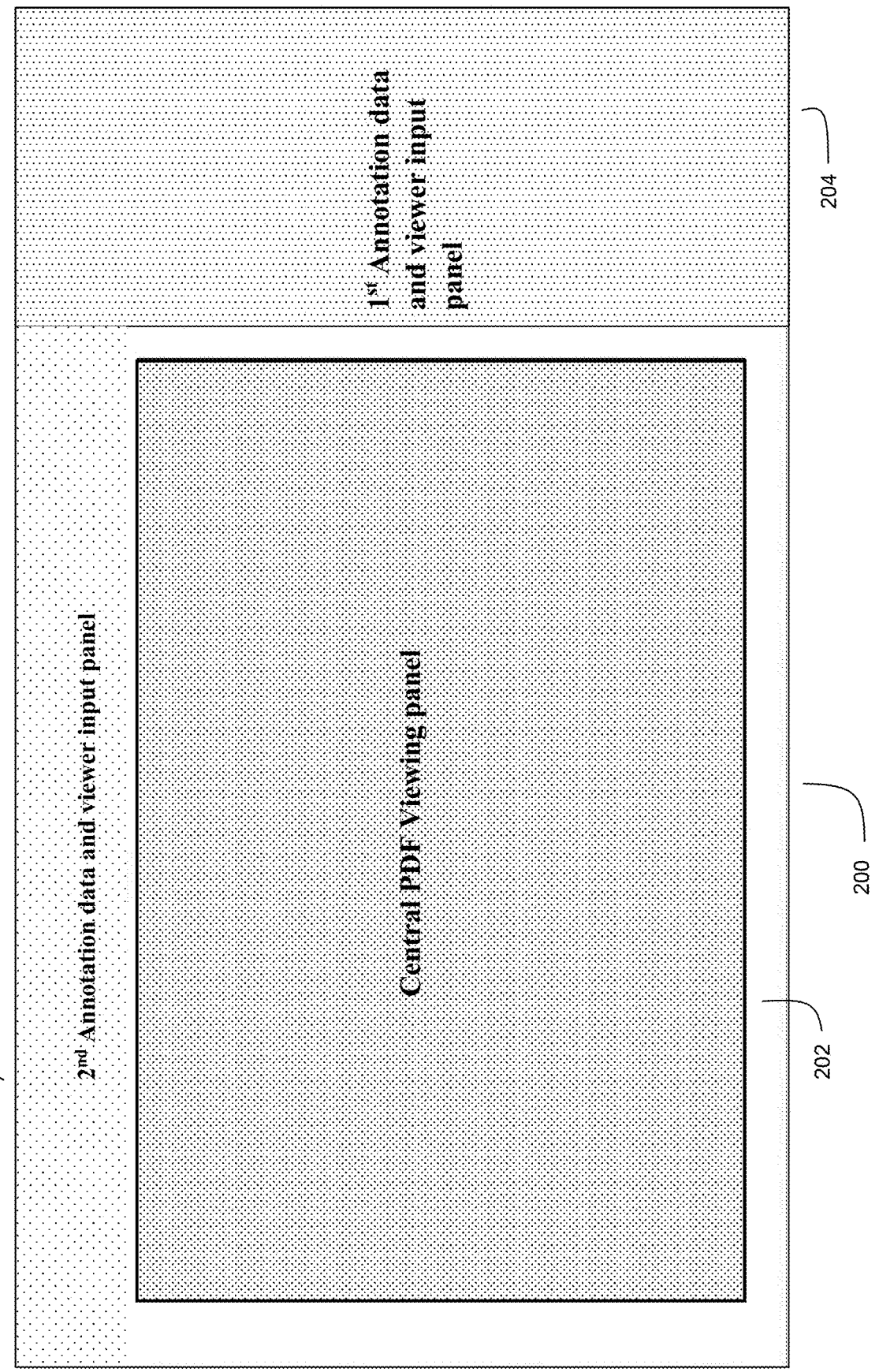
FIG. 2 shows an example of a viewer graphical user interface (GUI) on a remote computerized device. This example shows portions of the original PDF in the central viewing panel. Other GUI interfaces are possible and, in some embodiments, some or all of the enhanced content data (annotations) can be overlayed on top of the PDF viewing panel. Specific enhanced content data, as provided by the enhancement server, are shown in the first and second annotation data and viewer input panels.

FIG. 2 shows an example of a viewer graphical user interface (GUI) (200) as seen on the remote computerized device (102). In this example, portions of the original PDF (114) are shown in the central viewing panel (202). Certain enhanced content data (120, 121), as provided by the enhancement server (100), are shown in the first and second annotation data and viewer input panels (202, 204). Other GUI interfaces are possible, and, in some embodiments, some or all of the enhanced content data (annotations) can be overlayed on top of the PDF viewing panel.

In some embodiments, this redirected viewer GUI input (138, 138a) and redirected response PDF document enhanced content data (142) may be used for any of questions and answers, walkthroughs, purchases, surveys, discussions, chats (any of one-to-chats, and group chats), and other applications. Given the worldwide nature of the internet, these chats can take place between users anywhere in the world.

As previously discussed, the enhancement server can combine the PDF information (114) with the PDF annotation data (121), thus producing at least some annotated PDF information (134, 136). This combination can be done at the server itself or at the remote computerized device 102. More specifically, in some embodiments, the enhancement server (100) can transmit the annotated PDF information (134, 136) in any of HTML format (such as HTML 5 or backward compatible equivalent) or non-HTML format.

In the HTML format situation, the remote computerized device (102) can receive this annotated PDF information (134, 136) and display the annotated PDF information using a web browser. Alternatively, if the annotated PDF information is being transmitted in a non-HTML format, this information may be displayed using custom software, such as the GUI of an app running on the remote computerized device. In either event, the remote computerized device receives viewer GUI input according to the annotated PDF information (e.g., the device can see if the user is clicking on a specific area of the annotated PDF as displayed on the GUI). It transmits information (138) about at least some of this viewer GUI input to the enhancement server (100).

So, for example, say the enhancement is to display a big bullseye on page 3 of the PDF, with the instructions "click here to receive a surprise." The remote computerized device receives this viewer GUI input, according to this bullseye, and transmits this back to the enhancement server. In this example, the enhancement server can process this click and send the surprise file back to the remote computerized device. In this example, the surprise file is the Rick Ashley multimedia video "Never gonna give you up."

In general, the viewer GUI input (138) can comprise any of text, sound, video, graphics, mouse coordinates, and copy or paste commands. Further, the PDF document enhanced content data (120, 121) can comprise any of text, sound, video, graphics, and mouse cursor movement or position commands.

In many of the examples shown here (see FIG. 3-7) the system has been configured to use the remote computerized device (102) to display the annotated PDF information (121) on a panel-type GUI (200). This GUI is configured according to a multi-use functional panel type graphical layout. Here the "at least some PDF information" is displayed on a central panel (202). Some or all of the PDF annotation data is displayed on one or more side panels (204, 206).

Figure 3:
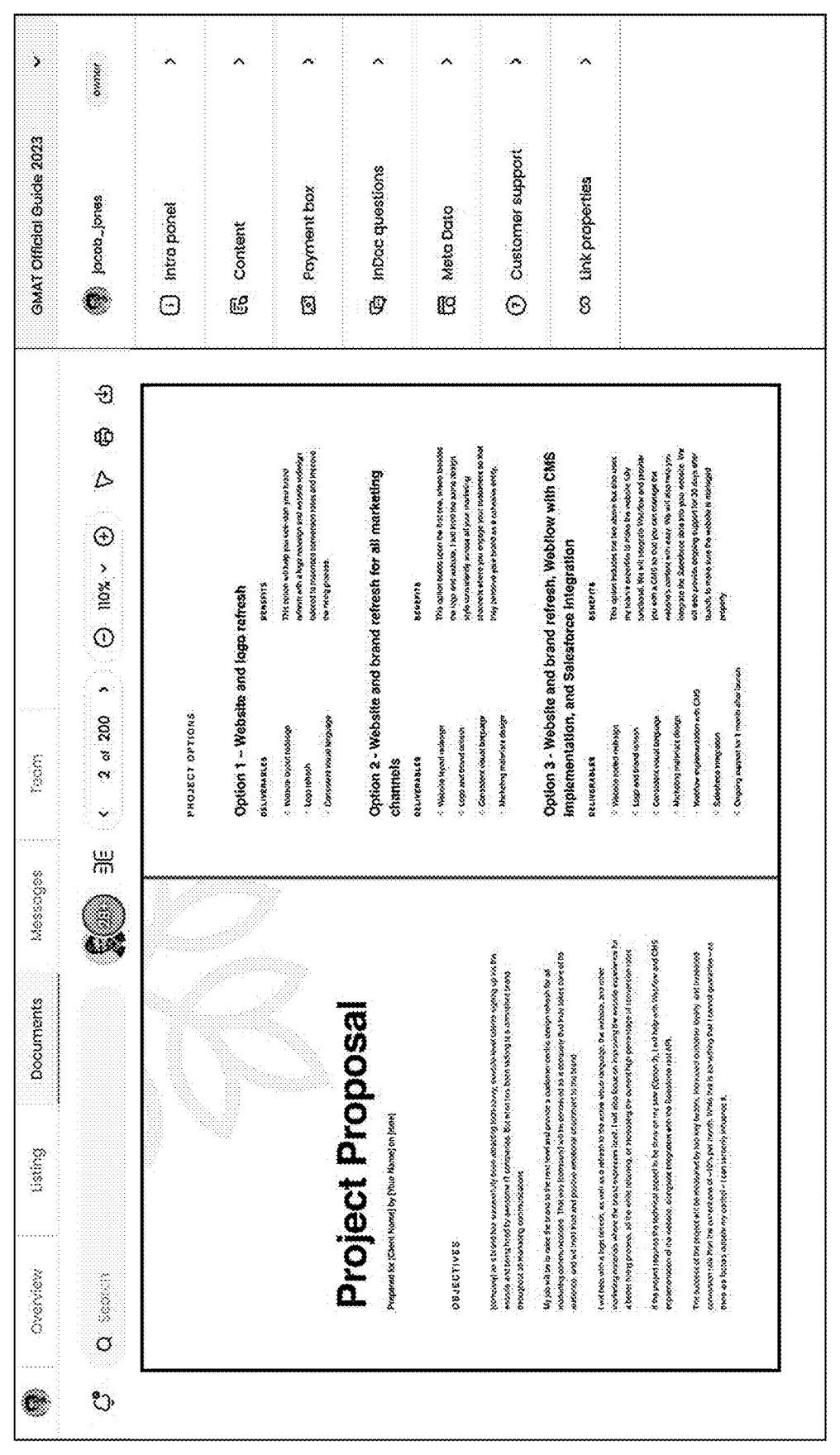

FIG. 3 shows an example of the system displaying an original PDF (114) in the central panel enhanced with various enhanced content data in first and second side panels. Here the first side panel includes a user interface with various regions configured to detect viewer GUI "mouse" input in these regions. The system will be configured to receive viewer GUI input in these regions and provide additional enhanced content data, and/or redirect the viewer input to other servers.

One unfortunate aspect of jumping from a webpage with a PDF to a separate PDF document is that, due to the limitations of human short-term memory, the "out of sight out of mind" effect occurs. From a psychological point of view, once the original website page is no longer shown, the user rapidly forgets the context of the website when they move to another platform. To help preserve this context, in some embodiments, the system can be configured to render the PDF file with a transparent or translucent background that continues to show the at least portions of the original website page that contained that particular PDF URL link. This allows the user to continue to see at least a dim or hazy version of the original website page as a background. This original webpage background can be behind any of the central panel and various side panels as desired. This feature allows the reader to help remember the context of the original webpage while they are now reading the PDF.

This can be done by, for example, using any of the remote computerized device and the enhancement server to display the annotated PDF information on a GUI overlayed over an image of the originating webpage that contained the HTML link to the PDF document URL.

Figure 4:
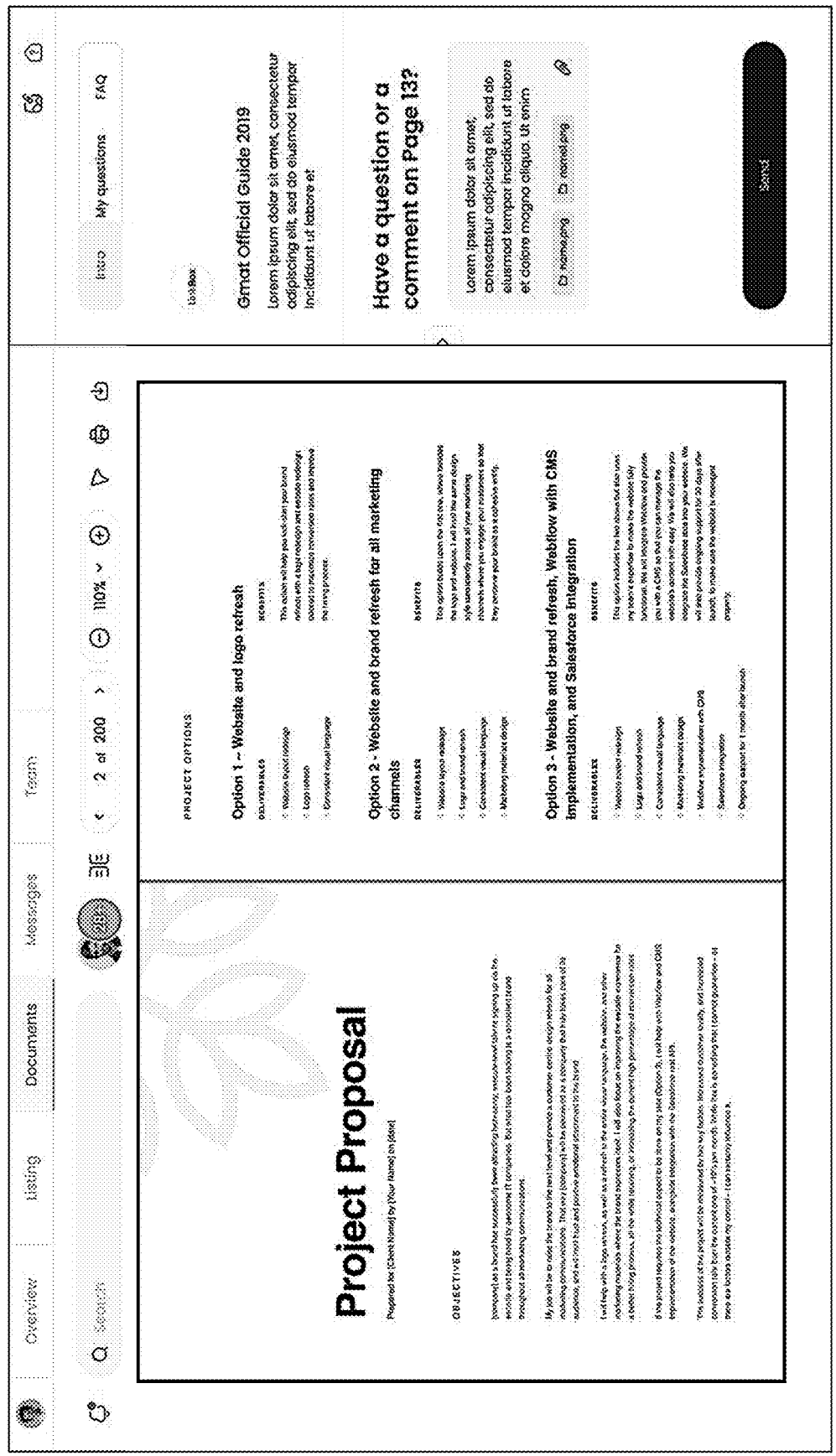
FIG. 4 shows how the system can be configured to use the first side panel to prompt the user/viewer for questions relating to the original PDF document displayed in the central panel.

FIG. 4 shows how the system can be configured to use the first side panel to prompt the user/viewer for questions relating to the original PDF document displayed in the central panel.

Figure 5:
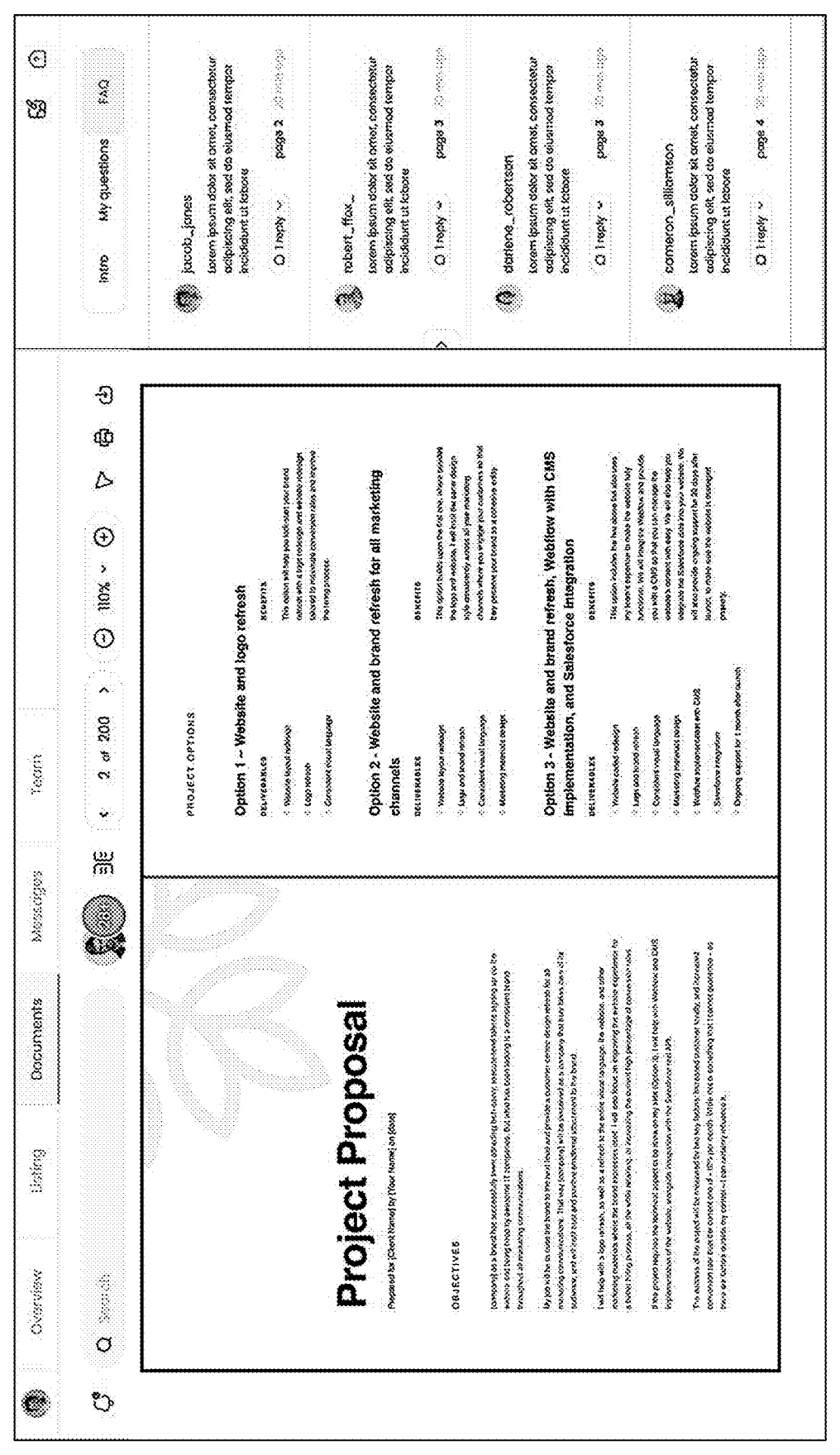

FIG. 5 shows how the system can alternatively be configured to use the first side panel to show comments from other users/viewers.

Figure 6:
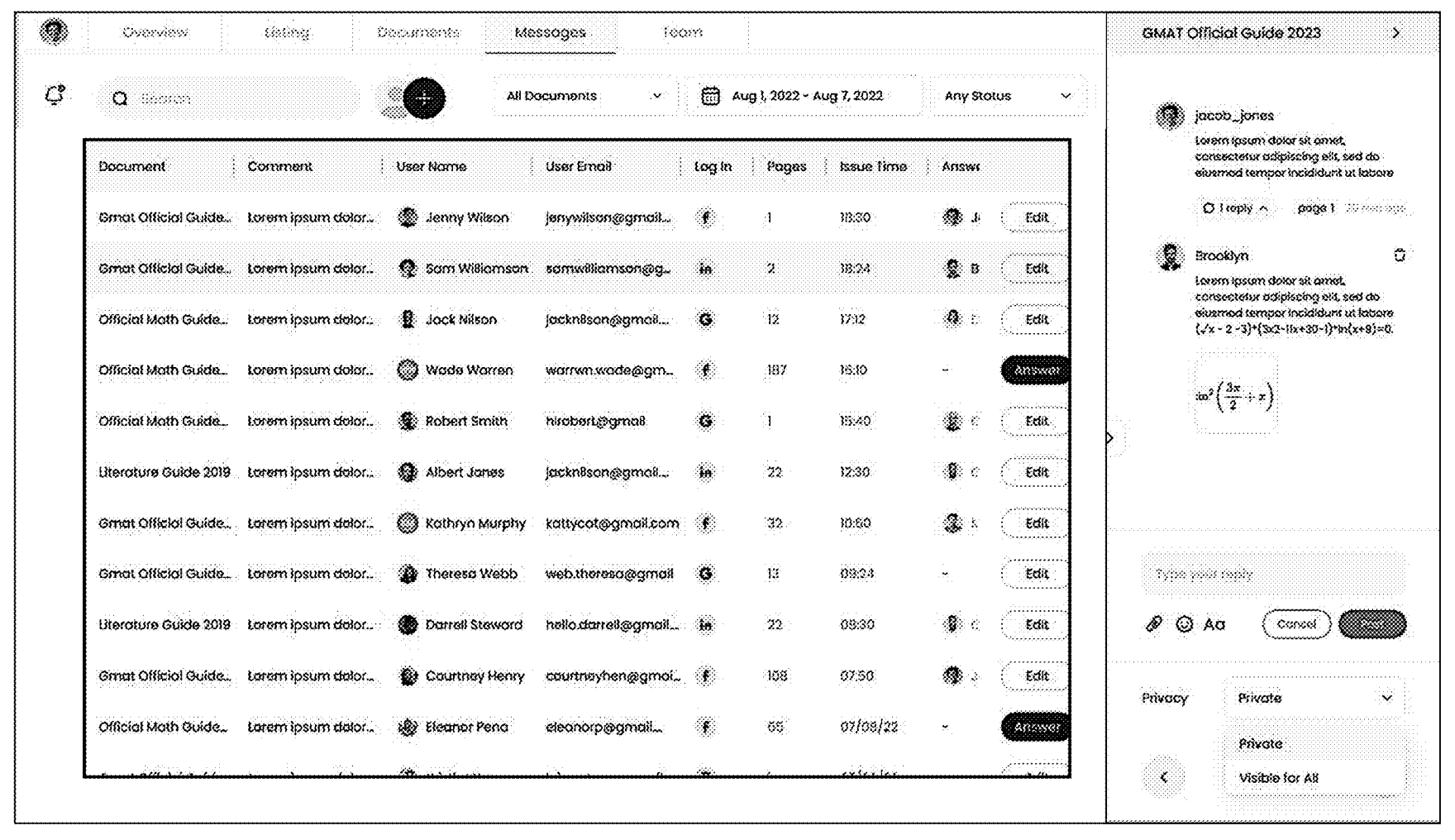

FIG. 6 shows how in some embodiments, the system can be configured to temporarily use the main panel to display a list of other system users and the PDF documents they are reading. This can be useful for group discussion and other group efforts.

Figure 7:
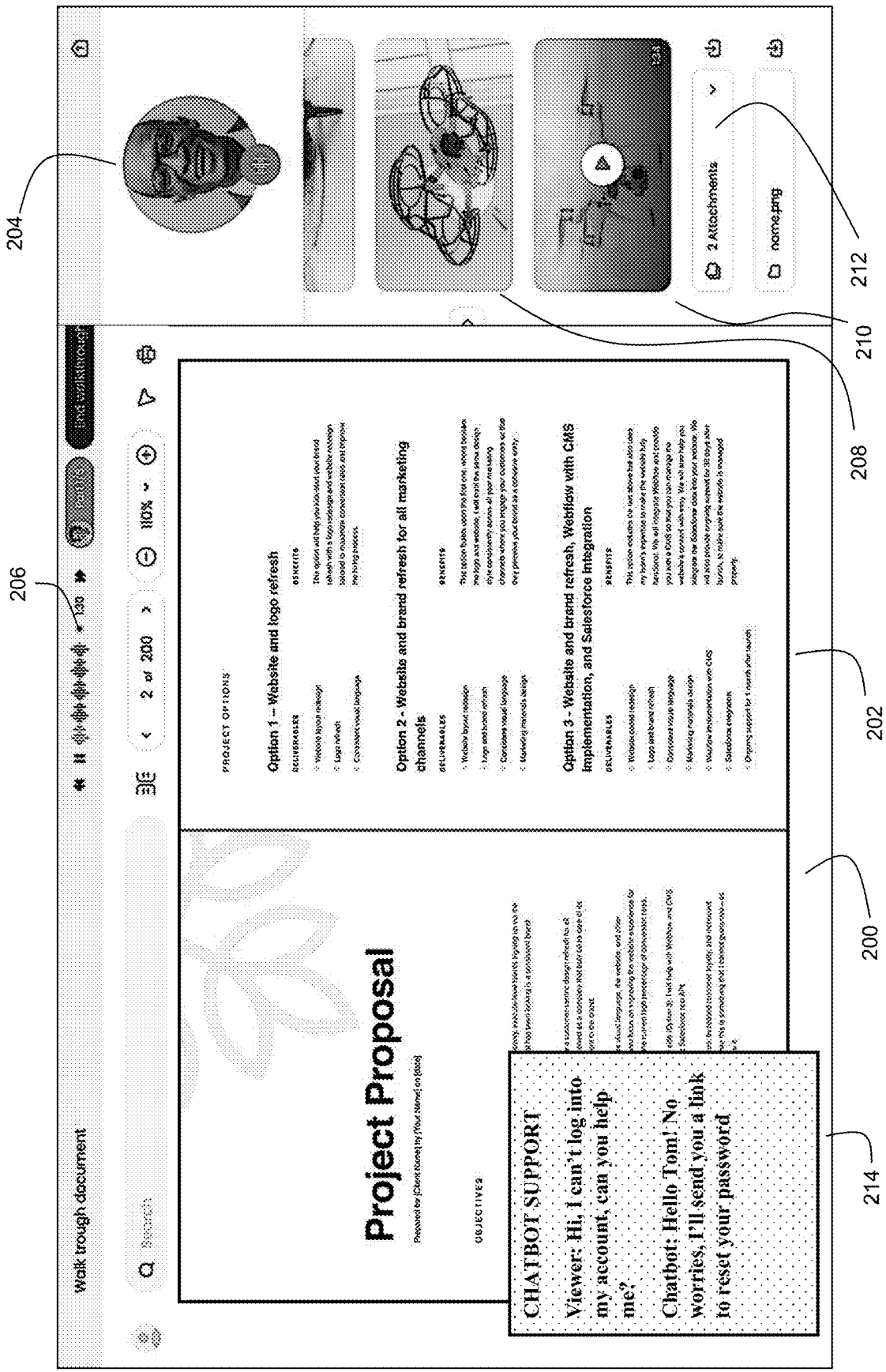
FIG. 7 shows how the system can be configured in some embodiments to annotate the PDF documents with other media, such as audio media, images, video, 3D graphics, and the like. One user (an instructor) has provided a walkthrough of this particular PDF document in this example. Here the instructor has offered audio narration files, image files, and video files, which the viewer can then refer to while reading the original PDF document. The system has also implemented "pop-up" chatbot functionality, here shown partially overlaying the central PDF viewing panel.

FIG. 7 shows how in some embodiments, the system can be configured to annotate the PDF documents with other media, such as audio media, images, video, 3D graphics, and the like. In this example, one user (such as an instructor 204) has provided a walkthrough of this particular PDF document. Here the instructor has provided audio narration files (206), image files (208), video files (210), and other downloadable files (212), which the viewer can then refer to while reading the original PDF document. Additionally, the system has also implemented "pop-up" chatbot functionality (214), here shown partially overlaying the central PDF viewing panel (202).

Other applications include collaborative whiteboard integration inside a PDF, walkthrough video that is tied to a particular PDF page number, and video/3D image uploads and images on a PDF.

Statistics

In some embodiments, the enhancement server (100) uses its corresponding PDF document statistics database field (116) to accumulate various types of PDF use statistics over a plurality of different viewers. These statistics can include any of time spent per PDF document, mouse heat maps, time spent various PDF pages per user, number of times a user stored a PDF on the user's drive, number of times the PDF document was printed, what document materials/text were associated with various user copy commands, and other statistics as the system operator's desire.

Figure 8:
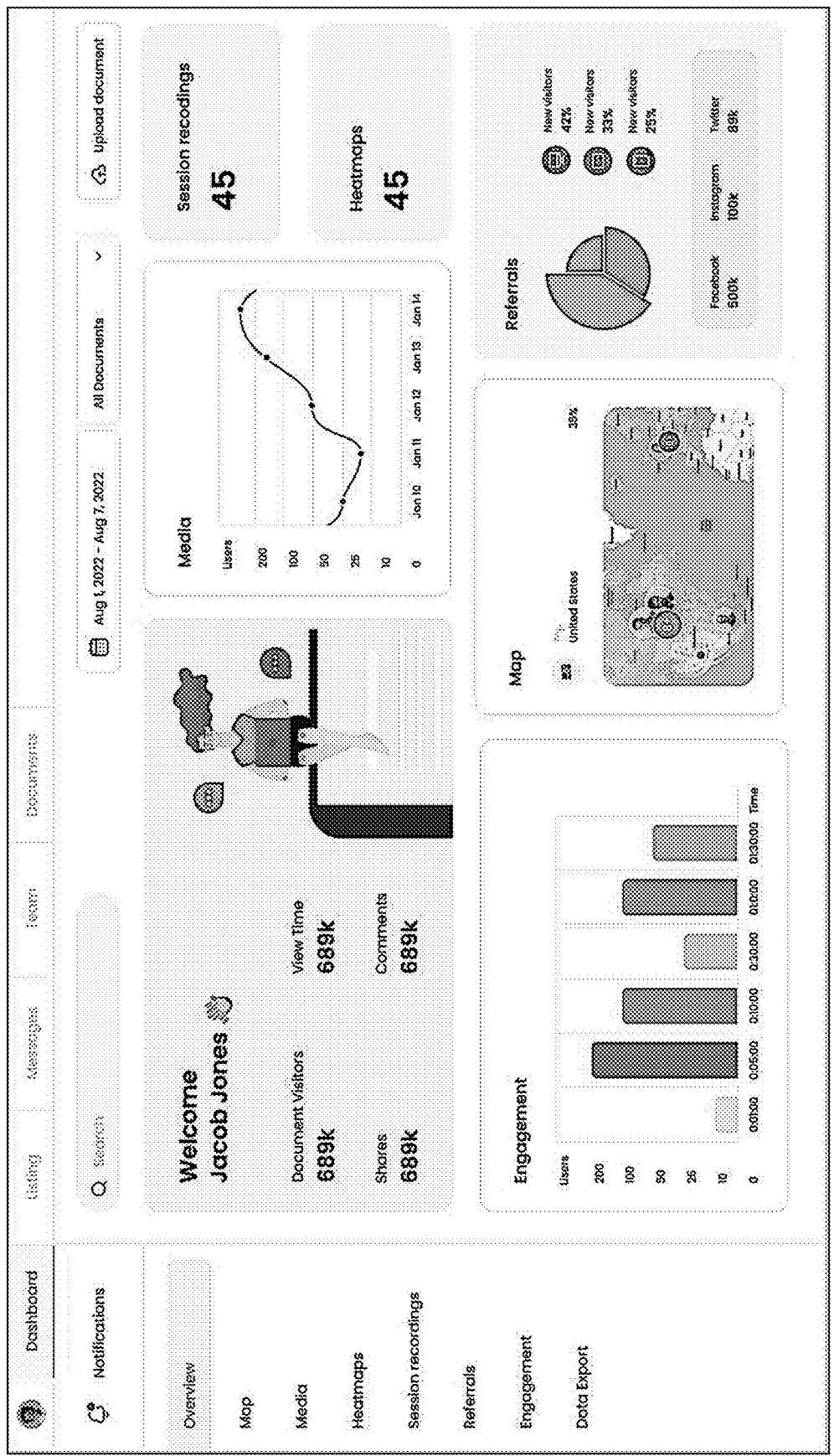
FIG. 8 shows an example of how the system can be configured to accumulate PDF document serving and viewing statistics, then display these statistics to appropriate viewers on a dashboard type GUI (shown here) or another output method.

FIG. 8 shows an example of how the system can be configured to accumulate PDF document serving and viewing statistics (116) and then display these statistics to appropriate viewers on a dashboard-type GUI (shown here) or other output methods.

SEO Optimization

As previously discussed, in some embodiments, some of the corresponding PDF document enhanced content data database fields (120, 121) can comprise search engine optimization (SEO) data relevant to that PDF document and a given SEO target URL.

Here, the enhancement server (100) can be configured to further transmit this search engine optimization (SEO) data relevant to a target URL server back to the original target URL server. This target URL server can, in turn, display at least some of the SEO data on at least one SEO accessible webpage and/or update an enhanced version of the original PDF for further SEO searches and optimization.

The invention claimed is:

1. A method of enhancing PDF documents with data stored external to said PDF documents, said method comprising:
    using an enhancement server comprising at least one server processor, and a database to store a plurality of PDF document files;
    said PDF document files comprising original PDF documents that comprise at least some signed or locked PDF documents that cannot be edited;
    wherein, for at least some of said plurality of said signed or locked PDF document files, said database links at least said signed or locked PDF document files with at least one corresponding PDF document URL; and
    said database also links at least said signed or locked PDF document files with corresponding PDF document enhanced content data, and corresponding PDF document statistics;
    receiving, using said enhancement server, a PDF document URL request comprising a request PDF document URL from a remote computerized device;
    using said enhancement server, request PDF document URL, and said corresponding PDF document URL to look up a corresponding PDF document file, and obtain at least a portion of said PDF document stored in said corresponding PDF document file, as well as PDF annotation data from said corresponding PDF document enhanced content data;
    combining, using said enhancement server, said portion with said PDF annotation data so as to produce, without modifying any of said signed or locked PDF documents, at least some annotated PDF information;
    transmitting, using said enhancement server, said annotated PDF information to said remote computerized device;
    wherein said remote computerized device displays said annotated PDF information on a graphical user interface (GUI) while also receiving viewer GUI input in response to a user interaction with said annotated PDF information;
    receiving, using said enhancement server, said viewer GUI input pertaining to said annotated PDF information from said remote computerized device;
    using said enhancement server, and at least one set of analysis criteria, to process said viewer GUI input according to said annotated PDF information, and perform any of
    a) updating said corresponding PDF document statistics pertaining to at least some signed or locked PDF documents; and
    b) updating said corresponding PDF document enhanced content data pertaining to at least some signed or locked PDF documents.

2. The method of claim 1, wherein said corresponding PDF document enhanced content data comprises at least one set of redirect information and redirect addresses, and said at least one server processor is configured to use said viewer GUI input and said redirect information to transmit at least some of said viewer GUI input, as redirected viewer GUI input to said redirect address when said viewer GUI input matches said redirect information.

3. The method of claim 2, further using either said enhancement server and database, or a redirect server and redirect database, and said redirect address to process said redirected viewer GUI input, and to provide additional redirected response PDF document enhanced content data to any of said corresponding PDF document enhanced content data, corresponding PDF document statistics, and said remote computerized device.

4. The method of claim 2, wherein said redirected viewer GUI input and redirected response PDF document enhanced content data are used for any of questions and answers, walkthroughs, purchases, surveys, discussions, and chats.

5. The method of claim 1, wherein said viewer GUI input comprises any of text, sound, video, graphics, mouse coordinates, and copy or paste commands, and said PDF document enhanced content data comprises any of text, sound, video, graphics, and mouse cursor movement or position commands.

6. The method of claim 1, said enhancement server transmits said annotated PDF information in any of HTML format or non-HTML format;
    said remote computerized device receives said annotated PDF information and displays said annotated PDF information on any of a web browser or app GUI; and
    said remote computerized device receives viewer GUI input according to said annotated PDF information, and transmits information pertaining to at least some of said viewer GUI input to said enhancement server.

7. The method of claim 6, further using said remote computerized device to display said annotated PDF information on a GUI configured according to a multi-use functional panel graphical layout wherein said at least some PDF information is displayed on a central panel, and said PDF annotation data is displayed in one or more side panels.

8. The method of claim 6, further using any of said remote computerized device and said enhancement server to display said annotated PDF information on a GUI overlayed over an image of a webpage that contained a HTML, link to said PDF document URL.

9. The method of claim 1, wherein said enhancement server further uses said corresponding PDF document statistics to accumulate, over a plurality of different viewers, any of time spent per document, mouse heat maps, time spent on page per user, number of times document stored, number of times document printed, and what document materials/text were associated with user copy commands.

10. The method of claim 1, wherein at least some of said corresponding PDF document enhanced content data comprises search engine optimization (SEO) data relevant to said PDF document and a SEO target URL.

11. The method of claim 10, wherein said enhancement server transmits said search engine optimization (SEO) data relevant to a target URL server, and said target URL server displays at least some of said SEO data on at least one SEO accessible webpage.

12. The method of claim 1, wherein said enhancement server comprises a single server.

13. A system for enhancing PDF documents with data stored external to said PDF documents, said system comprising:
an enhancement server comprising at least one server processor, internet network interface, and a database to store a plurality of PDF document files;
said PDF document files being original PDF documents that comprise at least some signed or locked PDF documents that cannot be edited;
said enhancement server and database configured, for at least some of said plurality of said signed or locked PDF document files, to link, in said database, at least said signed or locked PDF document files with at least one corresponding PDF document URL; and
said database also configured to link at least said signed or locked PDF document files with corresponding PDF document enhanced content data, and corresponding PDF document statistics:
said enhancement server further configured to receive, over said internet network interface, a PDF document URL request comprising a request PDF document URL from a remote computerized device;
said enhancement server further configured to use said PDF document URL, and said database, to look up a corresponding PDF document file and obtain at least a portion of said PDF document stored in said corresponding PDF document file, as well as PDF annotation data from said corresponding PDF document enhanced content data;
said enhancement server further configured to combine said portion with said PDF annotation data so as to produce, without modifying any of said signed or locked PDF documents, at least some annotated PDF information;
said enhancement server further configured use said internet network interface to transmit said annotated PDF information to said remote computerized device;
said remote computerized device comprising at least one device processor, device memory, graphical user interface, and device internet network interface;
said remote computerized device configured to use said device processor and said device internet network interface to receive said annotated PDF information, and to display said annotated PDF information on said device GUI, while also receiving viewer GUI input in response to a user interaction with said annotated PDF information;
said remote computerized device further configured to use said device processor and said network interface to transmit said viewer GUI input to said enhancement server;
said enhancement server further configured to receive said viewer GUI input pertaining to said annotated PDF information from said remote computerized device, and to use said server processor and at least one set of analysis criteria, to process said viewer GUI input according to said annotated PDF information;
said enhancement server further configured to use said server processor and said database to perform any of
a) updating said corresponding PDF document statistics pertaining to at least some signed or locked PDF documents; and
b) updating said corresponding PDF document enhanced content data pertaining to at least some signed or locked PDF documents.

14. The system of claim 13, wherein said corresponding PDF document enhanced content data comprises at least one set of redirect information and redirect addresses, and said at least one server processor is configured to use said viewer GUI input and said redirect information to transmit at least some of said viewer GUI input, as redirected viewer GUI input to said redirect address when said viewer GUI input matches said redirect information.

15. The system of claim 14, further using either said enhancement server and database, or a redirect server and redirect database, and said redirect address to process said redirected viewer GUI input, and to provide additional redirected response PDF document enhanced content data to any of said corresponding PDF document enhanced content data, corresponding PDF document statistics, and said remote computerized device.

16. The system of claim 14, wherein said redirected viewer GUI input and redirected response PDF document enhanced content data are used for any of questions and answers, walkthroughs, purchases, surveys, discussions, and chats.

17. The system of claim 13, wherein said viewer GUI input comprises any of text, sound, video, graphics, mouse coordinates, and copy or paste commands, and said PDF document enhanced content data comprises any of text, sound, video, graphics, and mouse cursor movement or position commands.

18. The system of claim 13, said enhancement server is configured to transmit said annotated PDF information in any of HTML format or non-HTML format;
said remote computerized device is configured to receive said annotated PDF information and to use said device processor and any of a web browser or app to display said annotated PDF information on said device GUI;
wherein said remote computerized device is further configured to use said device processor and said device GUI to receive viewer GUI input according to said annotated PDF information, and to transmit information pertaining to at least some of said viewer GUI input to said enhancement server.

19. The system of claim 18, wherein said remote computerized device is further configured to use said device processor and said device GUI to display said annotated PDF information configured according to a multi-use functional panel graphical layout wherein said at least some PDF information is displayed on a central panel, and said PDF annotation data is displayed in one or more side panels.

20. The system of claim 13, wherein said enhancement server is further configured to use said server processor and said corresponding PDF document statistics to accumulate, over a plurality of different viewers, any of time spent per document, mouse heat maps, time spent on page per user, number of times document stored, number of times document printed, and what document materials/text were associated with user copy commands.

21. The system of claim 13, wherein at least some of said corresponding PDF document enhanced content data comprises search engine optimization (SEO) data relevant to said PDF document and a SEO target URL.

22. The system of claim 21, wherein said enhancement server is further configured to transmit said search engine optimization (SEO) data relevant to a target URL server, and said target URL server is configured to display at least some of said SEO data on at least one SEO accessible webpage.

23. The system of claim 13, wherein said enhancement server comprises a single server.

* * * * *